United States Patent
Chapkovich, III et al.

(10) Patent No.: US 8,341,934 B2
(45) Date of Patent: Jan. 1, 2013

(54) INFRARED SUPPRESSION SYSTEM WITH SPIRAL SEPTUM

(75) Inventors: John S. Chapkovich, III, Derby, CT (US); Henry E. Voegeli, Newtown, CT (US); Nathan C. Blair, Milford, CT (US); Jeffrey A. Math, Wallingford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 952 days.

(21) Appl. No.: 12/280,693

(22) PCT Filed: Dec. 7, 2006

(86) PCT No.: PCT/US2006/061734
§ 371 (c)(1),
(2), (4) Date: Aug. 26, 2008

(87) PCT Pub. No.: WO2007/106188
PCT Pub. Date: Sep. 20, 2007

(65) Prior Publication Data
US 2009/0025362 A1 Jan. 29, 2009

Related U.S. Application Data (60) Provisional application No. 60/777,658, filed on Feb. 27, 2006.

(51) Int. Cl.
*F02K 1/38* (2006.01)
(52) U.S. Cl. .................................. 60/262; 60/231
(58) Field of Classification Search .............. 60/262, 60/231, 264, 39.5, 324, 317, 319; 239/127.3; 181/213, 215, 216, 219, 220; 138/42, 43, 138/37; 454/33, 42
See application file for complete search history.

(56) References Cited

U.S. PATENT DOCUMENTS

| | | | |
|---|---|---|---|
| 1,755,924 A | 4/1930 | Keagle et al. | |
| 3,815,360 A | 6/1974 | Wellinitz | |
| 4,002,024 A * | 1/1977 | Nye et al. | 60/262 |
| 4,102,632 A * | 7/1978 | Hastings | 432/3 |
| 4,355,507 A | 10/1982 | Coffey et al. | |
| 5,269,132 A * | 12/1993 | Loucks | 60/204 |
| 6,055,804 A | 5/2000 | Hammond | |
| 6,606,854 B1 * | 8/2003 | Siefker et al. | 60/262 |

OTHER PUBLICATIONS

PCT International Search Report and Written Opinion, mailed Nov. 2, 2007.
European Search Report dated Aug. 2, 2012 for European Application No. 06850246.7.

* cited by examiner

*Primary Examiner* — Ehud Gartenberg
*Assistant Examiner* — Vikansha Dwivedi
(74) *Attorney, Agent, or Firm* — Carlson, Gaskey & Olds PC (57) ABSTRACT

An InfraRed Suppression System (IRSS) includes a double-walled exhaust duct and double walled septum. The double walled structure provides a flow path for secondary (non-exhaust gas) cooling air flow to slots along the surfaces exposed to exhaust gases. Exhaust gas flow past these slots draws cooling air across the duct and septum surfaces. This flow cools the surfaces close to the slots and mixes with exhaust gasses downstream to cool the exhaust plume. The septum in the shape of a helix rotating 360° fully blocks line-of-sight to the turbine exit from the aft of the aircraft. The exhaust duct is intended to be shrouded by an aerodynamic fairing which provides an aerodynamic contour which minimizes aerodynamic impact on the aircraft.

21 Claims, 8 Drawing Sheets

INFRARED SUPPRESSION SYSTEM WITH SPIRAL SEPTUM

The present application claims priority to U.S. Provisional Patent Application Ser. No. 60/777,658, filed Feb. 27, 2006.

BACKGROUND OF THE INVENTION

The present invention relates to an infrared suppression system (IRSS), and more particularly to an infrared suppression system which uses a film-cooled spiral septum within an exhaust duct to mask the engine exhaust and reduce the overall infrared signature of an aircraft.

The exhaust plume and plume-heated surfaces from a gas turbine engine may be a source of infrared (IR) energy which may be detected by heat seeking missiles and/or various forms of infrared imaging systems for targeting/tracking purposes. With respect to the former, a heat-seeking missile may obtain directional cues from infrared energy generated by the engine exhaust such that the amount of infrared energy is one of the primary determining factors of a missile's accuracy, and consequently, lethality. Regarding the latter, infrared imaging systems detect and amplify infrared energy for detection and/or targeting.

IR suppression systems are utilized on many military aircraft including most rotary wing aircraft to provide IR signature reduction. Future IR threats, however, will require even greater levels of IR signature reduction.

Generally, IR suppression systems are primarily designed to: (a) reduce the infrared energy below a threshold level of a perceived threat; (b) maintain engine performance; and (c) minimize weight and packaging associated therewith. Secondary consequences may include: (i) minimizing system or configuration complexity to reduce fabrication and maintainability costs; and (ii) minimizing the external aerodynamic drag produced by such IR suppressor systems.

Current IR suppression systems for rotary wing aircraft are primarily designed to mix the high temperature exhaust flow with a cooling airflow supplied by a mixing duct which communicates with an engine exhaust duct. The mixing of large amounts of ambient air with the engine exhaust reduces the overall gas temperature prior to "dumping" the engine exhaust overboard thus lowering the aircraft IR signature. To achieve significant reductions in temperature, however, a relatively significant volume of ambient air must mixed into the high temperature exhaust flow. This requires relatively large intakes and a final exhaust stage which provides a flow area capacity for the combined engine exhaust flow volume and the additional mixed in ambient airflow volume.

Such conventional IR suppressor systems are limited by packaging space restrictions thereof in which a relatively significant area is required to provide ample mixing and flow area. Adaptation to relatively small rotary wing aircraft or retrofitting to current aircraft packaging constraints may be limited and appropriate for designs with less stringent packaging space restrictions.

A high IR signature source on an unsuppressed aircraft is heated exhaust components (e.g. power turbine, deswirl vanes, duct walls). As such, one effective method of signature reduction is shadowing, masking, or cooling of these surfaces to minimize infrared emissions over particular viewing angles.

It is also desirable to minimize impingement of hot engine exhaust on adjacent aircraft structure so as to avoid, the generation of a "hot spot" separate from the primary source associated with the nozzle/exhaust plume. Disadvantageously, the mixing operation reduces the velocity of the exhaust flow such that the exhaust velocity may be too low to expel the exhaust far enough from the fuselage to avoid such a "hot spot." A farther disadvantage is that if the exhaust may not have enough velocity to escape rotor downwash and the exhaust gas may be re-ingested into the engines which reduces engine efficiency.

Accordingly, it is desirable to provide an Infrared Suppression System (IRSS) which reduces the overall IR signature of the aircraft, is compact in design, masks the IR energy emitted/radiated from a gas turbine engine for a given viewing/azimuth angle, and minimizes impingement of engine exhaust onto adjacent aircraft structure while maintaining engine performance and residual thrust.

SUMMARY OF THE INVENTION

The InfraRed Suppression System (IRSS) according to the present invention generally includes a double-walled exhaust duct and double walled spiral septum therein. The double walled structure provides a flow path for secondary (non-exhaust gas) cooling airflow to spiral septum slots in surfaces exposed to the exhaust gases. Exhaust gas which flows past these slots draws cooling air across the exhaust duct and spiral septum surfaces. This cooling flow cools the surfaces and mixes with exhaust gasses downstream to cool the exhaust plume.

The spiral septum serves to block line-of-sight to the heated exhaust components from threats. The spiral septum extends along the length of the exhaust duct and is twisted through 360° end to end to provide a helical shape which fully masks the engine power turbine from view.

The exhaust duct may also be shrouded by a fairing which provides contour which minimizes aerodynamic impact on the aircraft. Since elevated fairing temperatures contributes to the total aircraft IR signature, the fairing design and surrounding structure further provides convective cooling and minimizes exhaust impingement onto surfaces viewable by anticipated threats.

The IRSS design effectively hides and cools heated exhaust components, the IRSS achieves a significant reduction to the entire aircraft IR signature. The exhaust duct and spiral septum arrangement IRSS minimizes exhaust flow restrictions thus minimizing power loss of the associated engine.

The present invention therefore provides an Infrared Suppression System which reduces the overall IR signature of the aircraft, is compact in design, masks the IR energy emitted/radiated from a gas turbine engine for a given viewing/azimuth angle, and minimizes impingement of engine exhaust onto adjacent aircraft structure while maintaining engine performance and residual thrust.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
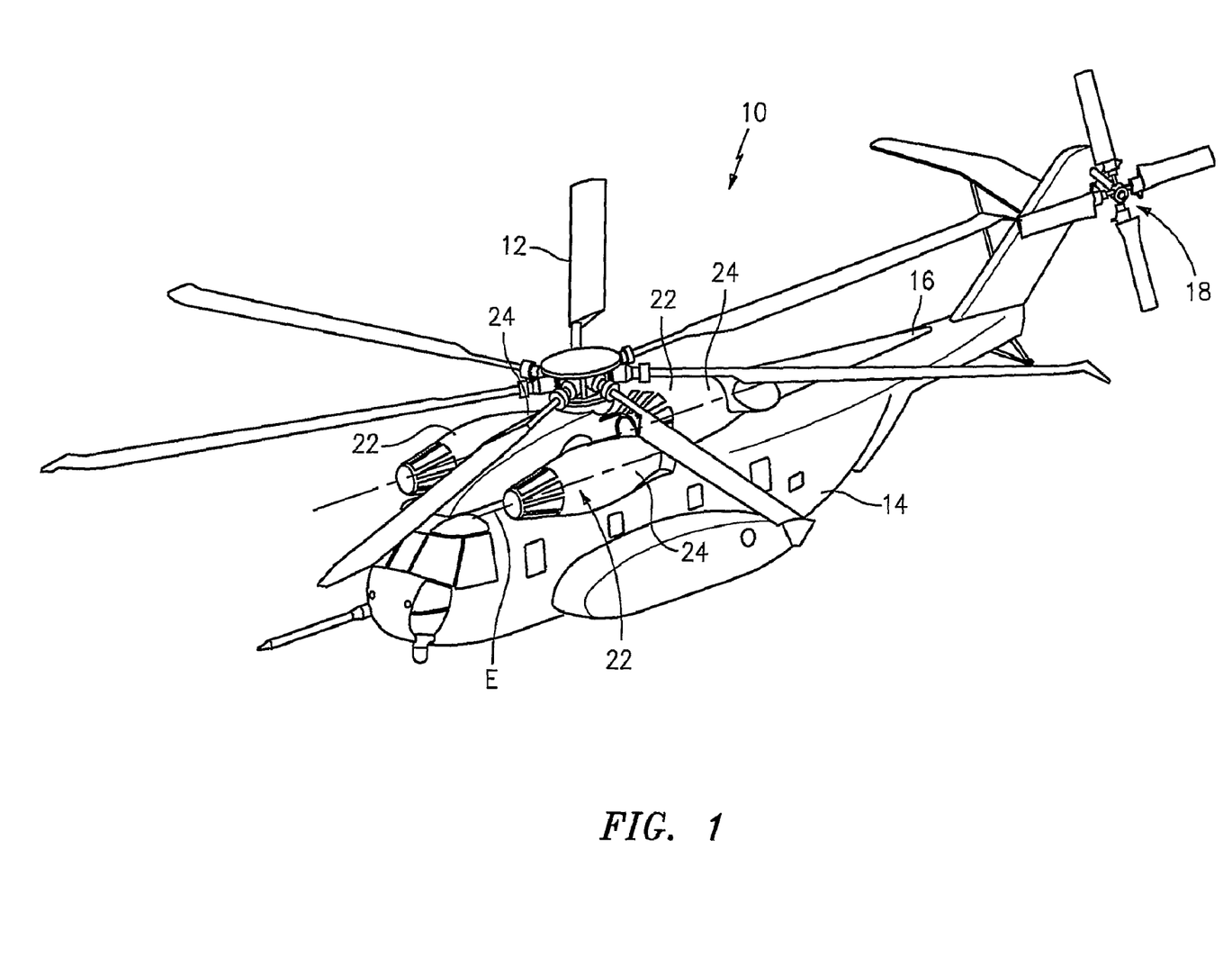
FIG. 1 is a general perspective view an exemplary rotary wing aircraft embodiment illustrating an exemplary installation of an IR suppressor system according to the present invention.

FIG. 1 schematically illustrates a rotary-wing aircraft 10 having a main rotor system 12. The aircraft 10 includes an airframe 14 having an extending tail 16 which mounts an anti-torque tail rotor system 18. The main rotor system 12 is driven about an axis of rotation A through a transmission (illustrated schematically at 20) by one or more gas turbine engines 22. Although a particular helicopter configuration is illustrated in the disclosed embodiment, other configurations and/or machines will also benefit from the present invention.

The rotary wing aircraft 10 also includes an InfraRed Suppression System (IRSS) 24 in communication with each gas turbine engine 22. The IRSS 24 suppresses the IR signature radiating from the high-temperature exhaust generated by the gas turbine engines 22. In the context used herein, "suppress" means that the TR signature emanating from the gas turbine engine 22 is reduced below that expelled by the gas turbine engine 22 after passage through the IRSS 24.

The IRSS 24 preferably is sized and configured to direct the high temperature exhaust gas and resultant IR energy generally aft of the engine 22 along the engine axis E generally parallel with the longitudinal axis of the aircraft 10. It should be understood, that although the axis E is generally linear and parallel with a longitudinal axis of the aircraft 10, other canting angles, directions and angle biases and curved shapes including, for example, a non-linear shape which directs the exhaust gas toward the rotor system 12 will also be usable with the present invention. It should be understood that relative positional terms such as "forward," "aft," "upper," "lower," "above," "below," and the like are with reference to the normal operational attitude of the vehicle and should not be considered otherwise limiting.

The IRSS 24 is sized and configured to minimize impingement of engine exhaust onto adjacent aircraft structure by discharging the flow away from the airframe 14 thereby reducing fuselage heating due to plume impingement in both hover and forward flight which in turn minimizes fuselage IR signature contributions.

Figure 2:
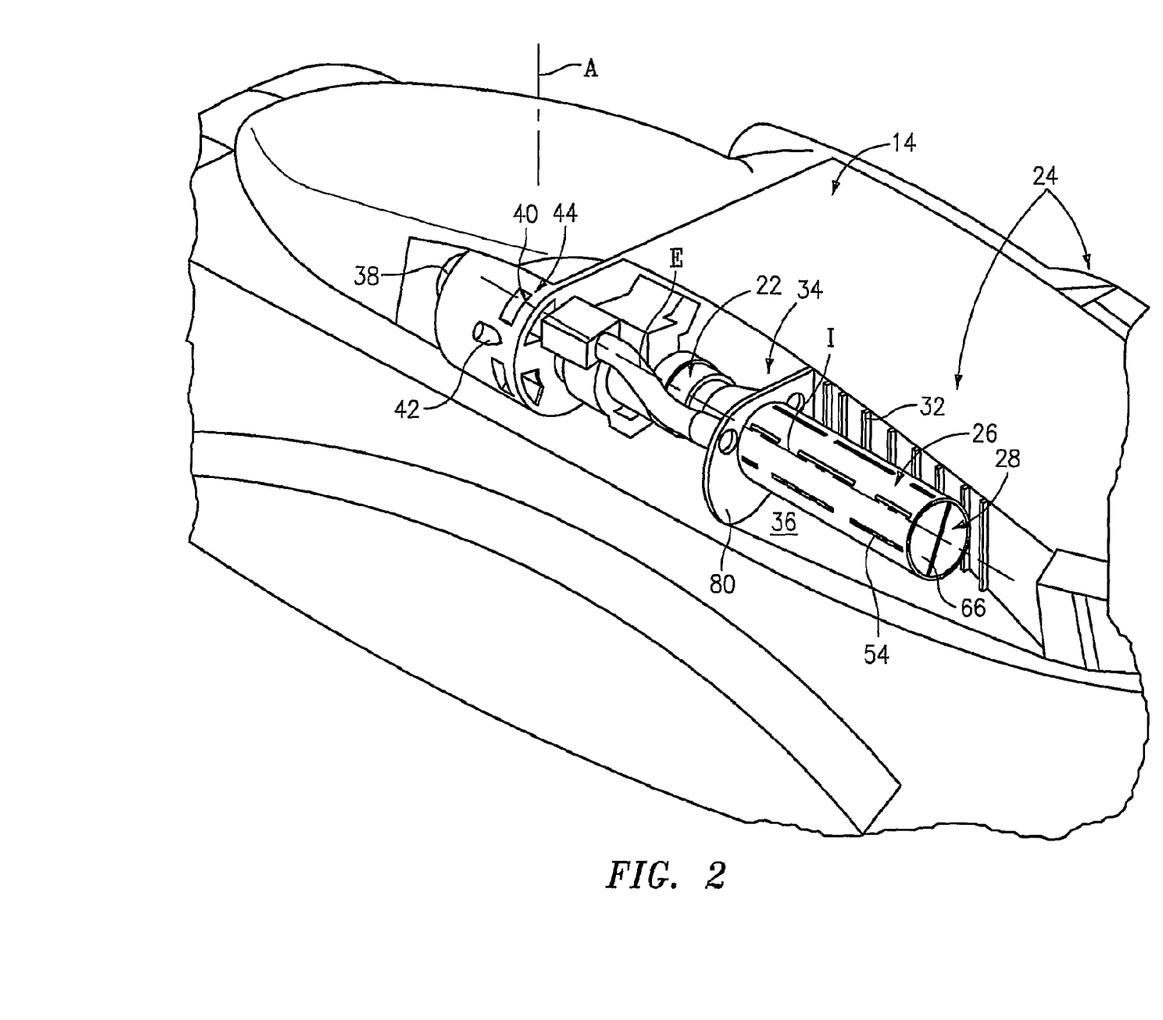
FIG. 2 is an expanded partial phantom perspective view of the IR suppressor system according to the present invention.

Referring to FIG. 2, the IRSS 24 is located adjacent to the gas turbine engine 22 and generally includes an exhaust duct 26 (FIG. 3A) and a spiral septum 28 (FIG. 3D) which extends within the exhaust duct 26 along a longitudinal axis I thereof. The exhaust duct 26 preferably defines a length to diameter ratio of approximately 4:1. The exhaust duct 26 receives a primary flow of high temperature engine exhaust from the gas turbine engine 22. The exhaust duct 26 preferably extends along a longitudinal engine axis E of the gas turbine engine 22. That is, the longitudinal axis I of the exhaust duct 26 is preferably parallel with the longitudinal axis of the engine E. That is, various nozzles may be located downstream of the IRSS 24 to further direct the exhaust gases as well as having the exhaust duct 26 being a non-linear component. As illustrated, the exhaust duct 26 is preferably of a substantially cylindrical shape, however, other shapes including frustro-conical shapes may likewise be utilized by the present invention.

The exhaust duct 26 directs the high temperature exhaust gas flow from the aft end of the gas turbine engine 22 through the spiral septum 28 (FIG. 3D) which spirals the exhaust gases and blocks line-of-sight to the heated engine component from threats aft of the aircraft. The spiral septum 28 extends along the length of the exhaust duct and is preferably twisted through 360° from end to end. This results in the spiral septum 28 taking a helical shape which fully masks the heated engine component from view. In other words, the spiral septum 28 is essentially a three-dimensional curve that twists around the IRSS axis I at a constant or continuously varying distance while moving parallel to the axis I to define a helix. It should be further understood that "spiral" as utilized herein to define the spiral septum 28 may take various twisted forms which rotate the exhaust gases and block line-of-sight but need not exactly meet the mathematical definition of a "spiral" or "helix."

The exhaust duct 26, having a relatively compact packaging envelope, may be attached to the airframe 14 by attachments 32 such that the exhaust duct 26 is contained within an aerodynamic exhaust fairing 34 (illustrated in phantom) which aerodynamically encloses a significant portion of the IRSS 24 to obscure line of sight to high temperature components thereof. The fairing 34 is preferably non-metallic and operates as a line-of-sight shield to such components. It should be understood that various attachments 32 may be utilized with the present invention, however, attachments which permit aerodynamic minimization of the exhaust fairing 34 such that the aerodynamic exhaust fairing 34 provides minimal aerodynamic impact to the aircraft are preferred.

The aerodynamic exhaust fairing 34 preferably defines a secondary cooling airflow path 36 (also illustrated in FIGS. 4A, 4B) between the exhaust fairing 34 and the exhaust duct 26. The secondary cooling airflow path 36 provides an insulated cooling airflow which further insulates the exhaust duct 26 from the aerodynamic exhaust fairing 34. That is, the secondary cooling airflow path 36 sheathes the exhaust duct 26.

The aerodynamic exhaust fairing 34 is preferably located adjacent to and aft of, an intake fairing 44 which incorporates an engine intake 38. One or more engine compartment air scoops 40 and one or more fairing inlets 42 are preferably located in the aerodynamic exhaust faring 34 separate from the engine intake 38. One or more of the engine compartment air scoops 40, and one or more of the fairing inlets 42 may additionally be located in or adjacent the intake fairing 44 as well as in other aircraft locations.

Figure 3A:
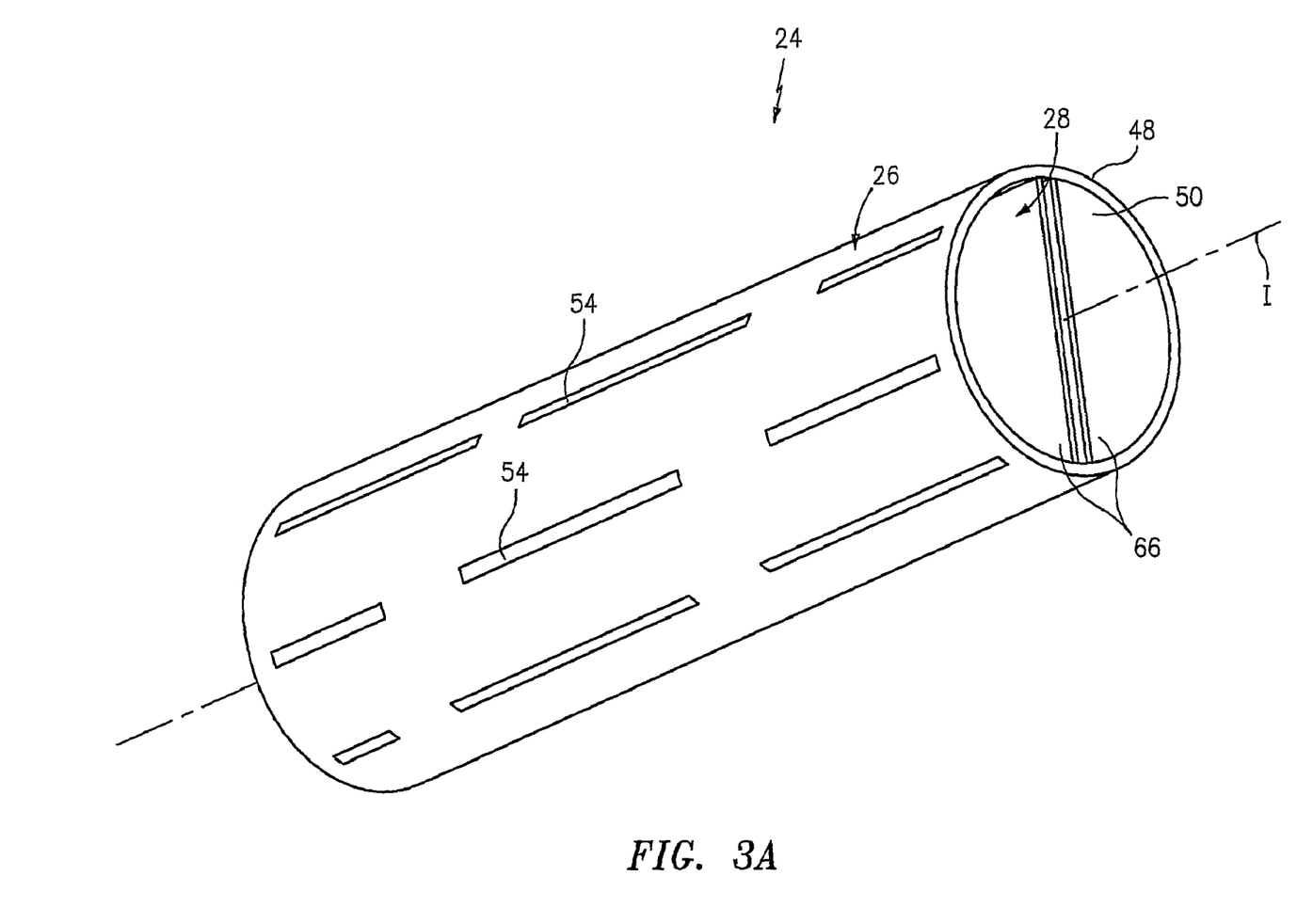
FIG. 3A is a rear perspective view of the IRSS with the exhaust duct exit in view.
Figure 3B:
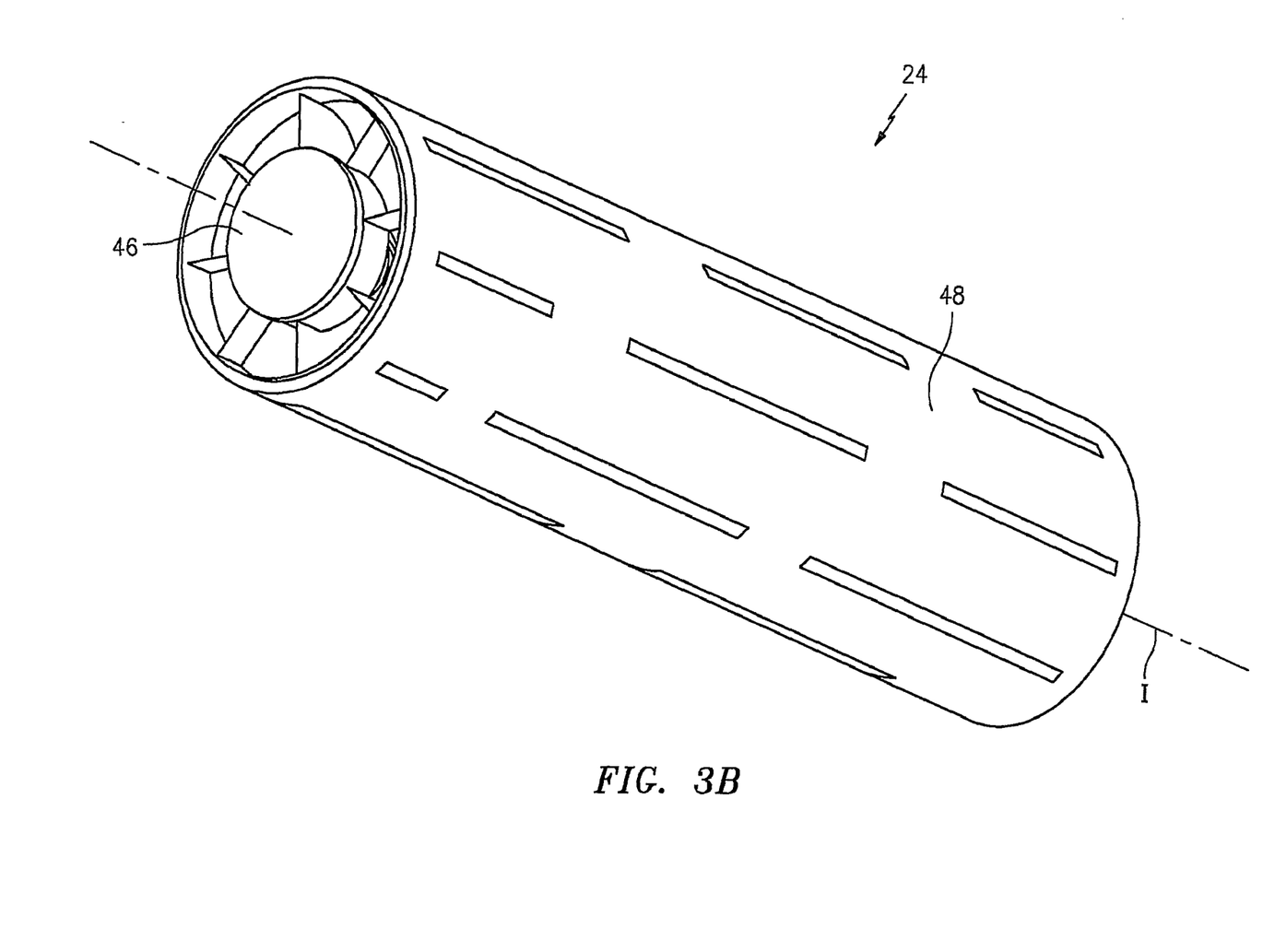
FIG. 3B is a front perspective view of the IRSS.

Referring to FIG. 3A, the IRSS 24 generally includes the exhaust duct 26, the spiral septum 28 and a de-swirler 46 (FIG. 33) mounted to an upstream end thereof. The exhaust duct 26 is a double-walled structure that includes an outer exhaust duct 48 and an inner exhaust duct 50 (illustrated without the outer exhaust ducts 48 in FIG. 3C) defined along the IRSS axis I.

The outer exhaust duct 48 includes a multiple of openings 54 in communication with the secondary cooling airflow path 36 (FIG. 2). The multiple of openings 54 are preferably longitudinal slots generally parallel to the IRSS axis I. It should be understood that the number, size and shape of the multiple of openings 54 may be varied to provide a predetermined flow into the IRSS 24 such that the IRSS 24 results in a minimal backpressure and exhaust flow restrictions penalties on the engine 22 thus minimizing power loss.

Figure 3C:
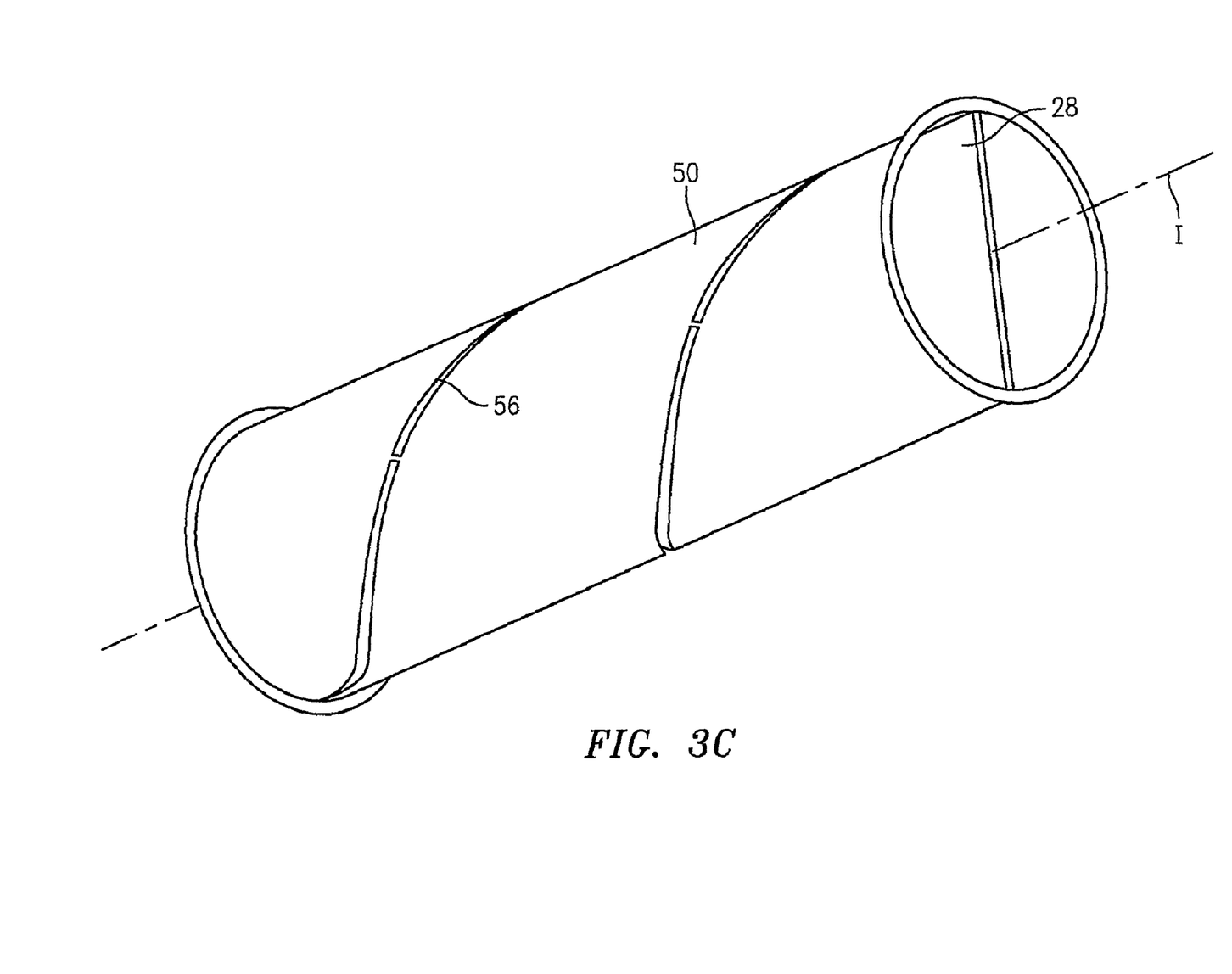
FIG. 3C is a perspective view of the IRSS with the outer wall of the exhaust duct removed so that the openings to the spiral septum are visible.

The inner exhaust duct 50 is spaced from the outer exhaust duct 48 to define an exhaust duct cooling air space 52 in communication with the secondary cooling airflow path 36. The inner exhaust duct 50 includes a spiral opening 56 (FIG. 3C). It should be understood that the spiral opening 56 may be continuous or segmented.

Figure 3D:
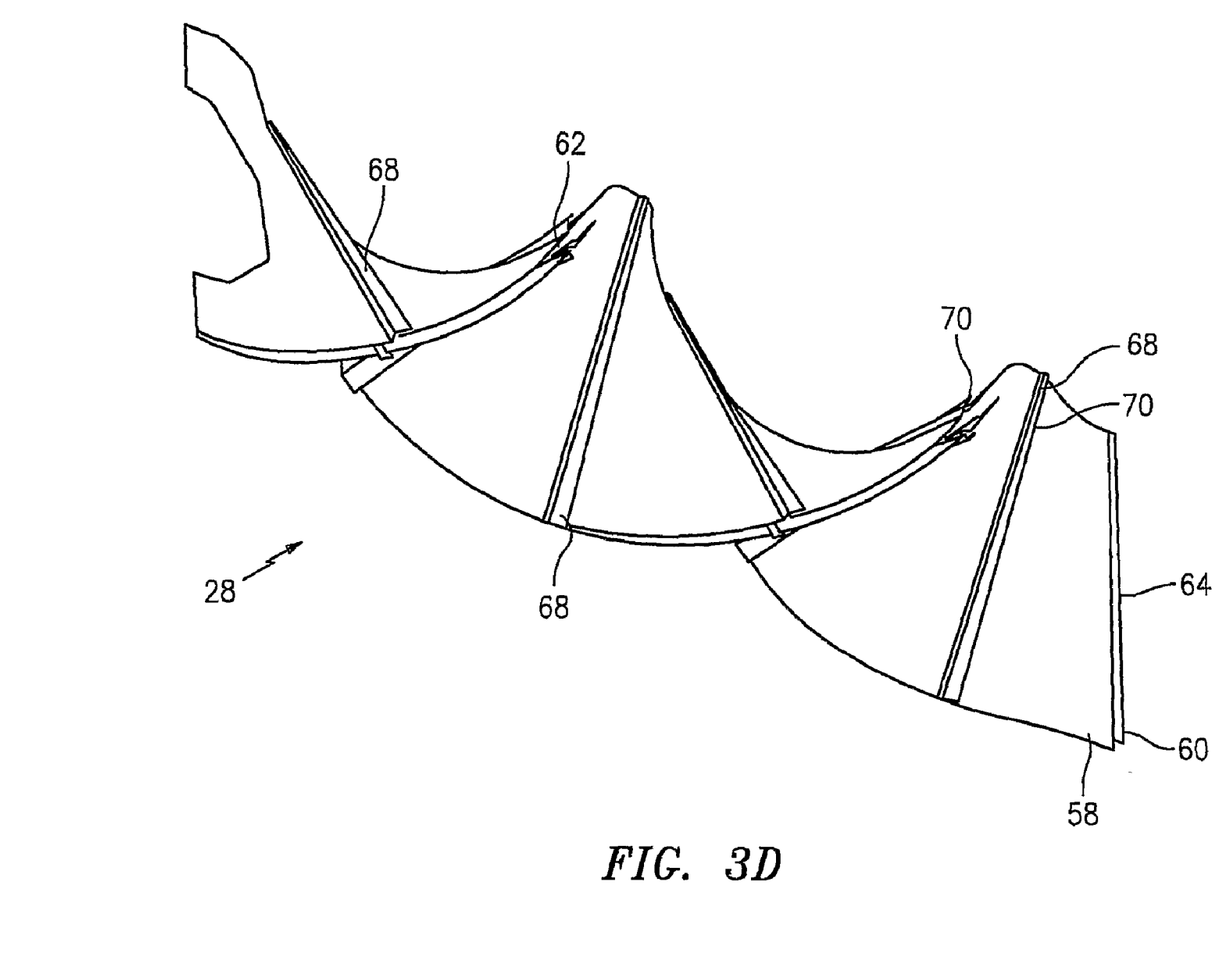
FIG. 3D is a perspective view of the spiral septum isolated from the remaining structure.

Referring to FIG. 3D, the spiral septum 28 including a double-walled structure having a first wall 58 and a second wall 60 which defines a spiral septum space 62 therebetween. The septum space 62 is in communication with exhaust duct cooling air space 52 through the spiral opening 56.

Cooling airflow from the secondary cooling airflow path 36 passes through the multiple of openings 54, the spiral opening 56 (FIG. 3C) and into the spiral septum space 62 from which it is discharged through a spiral septum exhaust 64 adjacent an exhaust duct exhaust 66 (FIG. 3A). The spiral septum 28 further include a multiple of vanes 68 adjacent an associated spiral septum opening 70 (FIG. 7B) to direct the cooling flow therefrom. A portion of the cooling airflow is distributed over the surfaces of the spiral septum 28 from the septum openings 70 in addition to the portion of cooling airflow distributed from the spiral septum exhaust 64. Cooling airflow from the septum openings 70 is distributed over the surfaces of the spiral septum 28 to film cool the surfaces of the spiral septum 28 exposed to high temperature exhaust gas flow and mix with the high temperature exhaust gas flow $E_f$ exhausted through the exhaust duct exhaust 66.

Figure 4A:
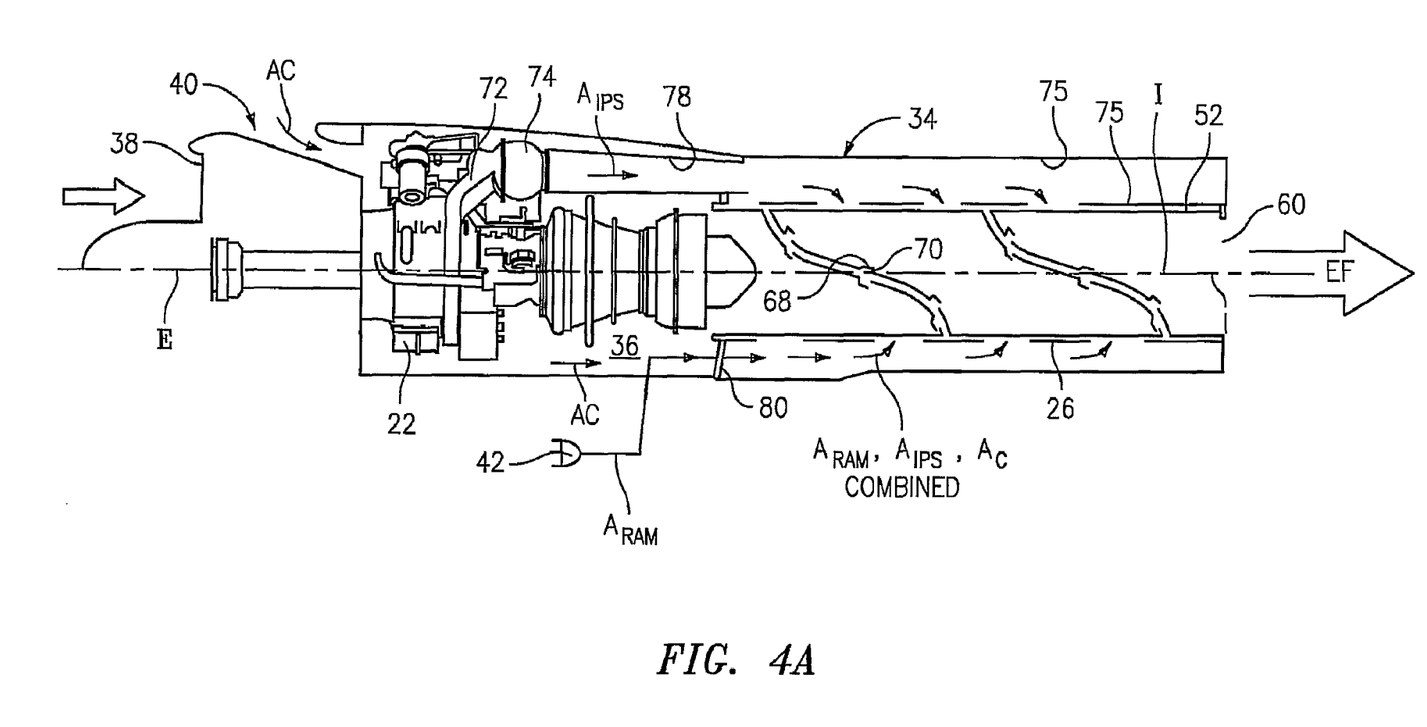
FIG. 4A is a sectional view of the IR suppressor system illustrating an exhaust flow.
Figure 4B:
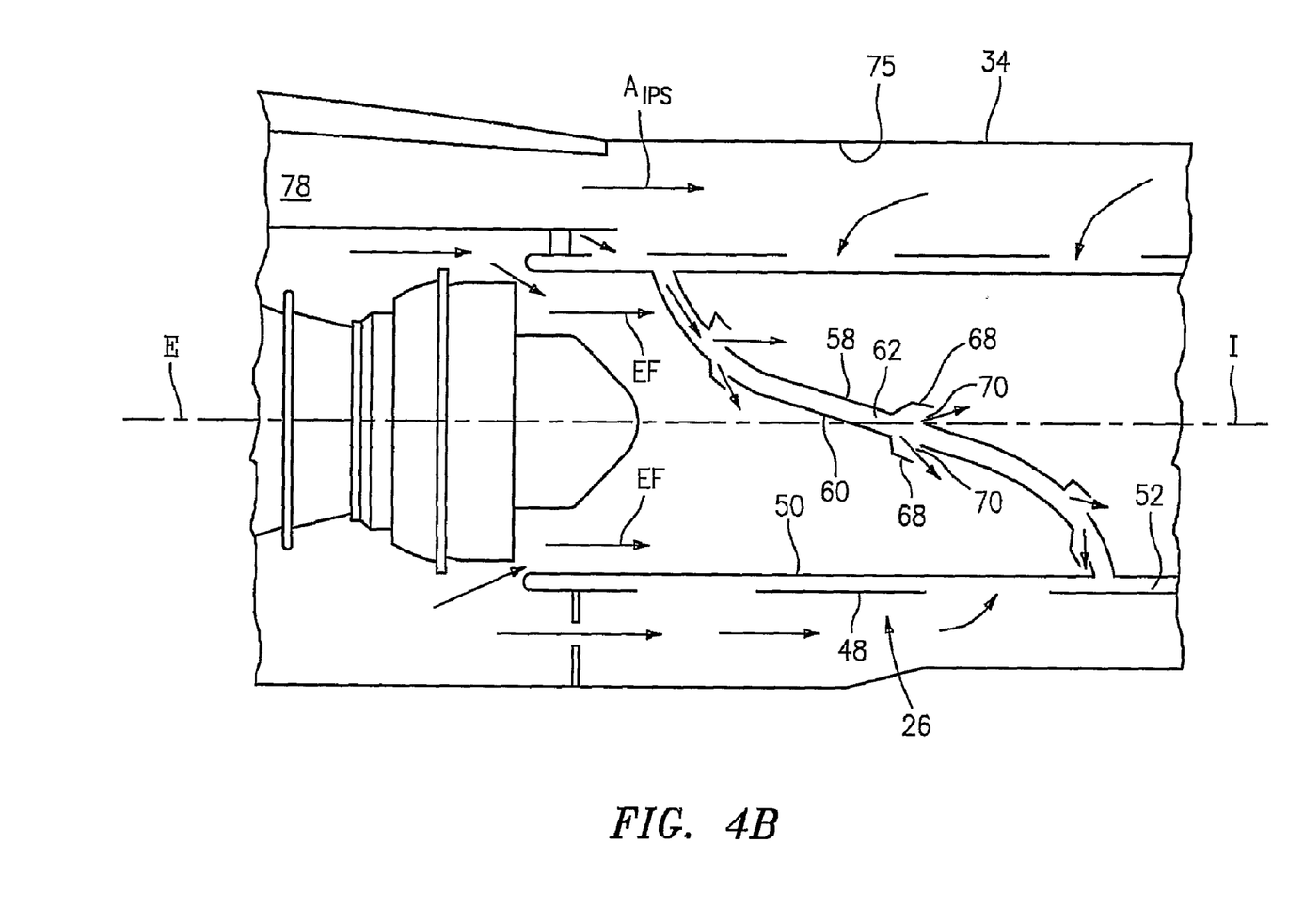
FIG. 4B is an expanded sectional view of the IR suppressor system of FIG. 4A.

Referring to FIG. 4A, the engine intake 38 provides primary airflow into the gas turbine engine 22. Various inlet particle separators (IPS) 72 (illustrated schematically) may be utilized to provide relatively "clean" airflow into the gas turbine engine 22 to minimize foreign object damage. It should be understood that various IPS systems and flow paths to the engine 22 may be utilized with the present invention.

From the gas turbine engine 22, the primary flow of the high temperature exhaust gas $E_f$ is deswirled through the de-swirler 46 (FIG. 3B) and communicated into the exhaust duct 26. The high temperature exhaust gas flow $E_f$ is exhausted through the exhaust duct 26 and along the spiral septum 28 which rotates the exhaust gases to facilitate diffusion of the high temperature exhaust gas flow $E_f$ and blocks line-of-sight to the hottest exhaust parts from threats aft of the aircraft.

An engine compartment artflow $A_c$ reduces the skin temperature of the aerodynamic exhaust faring 34 since elevated fairing temperatures may contribute to the aircraft's total IR signature. The IRSS 24 includes an insulated lining material 75 which is configured so that the IR energy which passes through the exhaust duct 26 is further masked thereby. More specifically, the insulated lining material 75, in conjunction with the engine compartment airflow $A_c$ ejected through the secondary cooling airflow path 36, provides additional skin surface cooling to still further minimize the aircraft thermal signature. To this end, the insulated lining material 75 is preferably located adjacent the exterior walls of the exhaust duct 26 and adjacent the internal walls of the aerodynamic exhaust fairing 34. The insulated lining material 75 may be Aerogel or a Nomex blanket material located within the secondary cooling airflow path 36 although other materials may also be utilized.

The one or more engine compartment air scoops 40 generate in part the engine compartment airflow $A_c$ to provide convectional cooling of the gas turbine engine 22 and associated systems, such as an Air Oil Cooler (AOC) fan 74 (illustrated schematically) which communicates the resultant Engine Inlet Particle Separator/Oil cooler airflow $A_{IPS}$ through an AOC duct 78.

The AOC duct 78 extends from the engine AOC fan 74 through the aft engine compartment firewall 80. The Engine Inlet Particle Separator/Oil cooler airflow $A_{IPS}$ may be dumped into aerodynamic exhaust fairing 34, or if there is no aerodynamic exhaust fairing 34 is just dumped into the outside air. The aerodynamic exhaust fairing 34 preferably includes passages through which the particulate from the IPS is expelled to the outside air generally parallel with the high temperature exhaust gas flow $E_f$.

The one or more fairing inlets 42 preferably communicate high-pressure ram air $A_{ram}$ to the secondary cooling airflow path 36 to augment the pumping action of the engine compartment airflow $A_c$ into the multiple of openings 54. That is, the high-pressure ram air $A_{ram}$ increases flow velocity from the septum openings 70 and spiral septum exhaust 64 to further insulate, mix, and obscure the high temperature exhaust gas flow $E_f$ exhausted through the exhaust duct 26. Engine Inlet Particle Separator/Oil cooler airflow Alps from the AOC (Air Oil Cooler) fan on the engine 22 may be combined with engine compartment airflow $A_c$ and the high-pressure ram air $A_{ram}$ for usage as the cooling airflow. It should be understood that various individual airflows as well as combinations of these and others may be utilized as the secondary (non-exhaust gas) cooling airflow.

As the secondary cooling airflow path 36 is preferably enclosed between the exhaust duct 26 and the aerodynamic exhaust fairing 34 the cooling airflow is directed through the multiple of openings 54, the spiral opening 56 and into the spiral septum space 62 such that the cooling airflow is distributed from the septum openings 70 and the spiral septum exhaust 64. The high temperature exhaust gas flow $E_f$ which passed along the inner duct and spirals around the spiral septum 28 also facilitates drawing of the cooling air from secondary cooling airflow path 36. The cooling airflow cools the surfaces of the spiral septum 28 and inner duct as well as mixes with the high temperature exhaust gas flow $E_f$ downstream to cool the exhaust plume.

It should be understood that the secondary (non-exhaust gas) cooling airflow that is not communicated into the directed through the multiple of openings 54 may alternatively or additionally be communicated into the aerodynamic exhaust fairing 34 or be dumped overboard should the secondary cooling airflow path 36 not be enclosed. That is, the aerodynamic exhaust fairing 34 may be located about the entire exhaust duct 26, may enclose only a portion thereof, or may not even be provided.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An InfraRed Suppression System comprising:
an exhaust duct to receive an engine exhaust flow, said exhaust duct comprising a double-walled structure having an inner wall and an outer wall, said outer wall includes a multiple of openings, said inner wall having a spiral opening in communication with a space between a first wall and a second wall of a spiral septum within said exhaust duct.

2. The InfraRed Suppression System as recited in claim 1, wherein said outer wall includes a multiple of longitudinal openings.

3. The InfraRed Suppression System as recited in claim 2, wherein said multiple of openings includes at least one slot parallel to an axis of said exhaust duct.

4. The InfraRed Suppression System as recited in claim 1, wherein said spiral septum includes a spiral septum exhaust adjacent an exhaust duct exhaust.

5. The InfraRed Suppression System as recited in claim 4, further comprising a de-swirler, said de-swirler upstream of said spiral septum exhaust.

6. The InfraRed Suppression System as recited in claim 1, further comprising an aerodynamic fairing which at least partially surrounds said exhaust duct to define a secondary cooling airflow path which at least partially sheathes the exhaust duct.

7. The InfraRed Suppression System as recited in claim 1, wherein said exhaust duct has a length to diameter ratio of approximately 4:1.

8. The InfraRed Suppression System as recited in claim 1, wherein said spiral septum includes a double-walled structure having a multiple of vanes, each of said multiple of vanes adjacent a spiral septum opening in communication with a space between said double-walled structure.

9. The InfraRed Suppression System as recited in claim 8, wherein said multiple of spiral septum opening are generally transverse to a longitudinal axis defined by said exhaust duct.

10. The InfraRed Suppression System as recited in claim 1, wherein said spiral septum within said exhaust duct is operable to receive a cooling air flow from within said exhaust duct.

11. The InfraRed Suppression System as recited in claim 1, wherein said spiral septum within said exhaust duct is operable to receive a cooling air flow from within said double-walled structure of said exhaust duct.

12. The InfraRed Suppression System as recited in claim 1, wherein said spiral septum includes a spiral septum exhaust adjacent an exhaust duct exhaust.

13. The InfraRed Suppression System as recited in claim 12, wherein said spiral septum exhaust and said exhaust duct exhaust are defined at an end section of said exhaust duct.

14. The InfraRed Suppression System as recited in claim 12, wherein said double-walled structure defines said exhaust duct exhaust.

15. The InfraRed Suppression System as recited in claim 12, wherein said spiral septum exhaust is defined at an end section of said exhaust duct.

16. An InfraRed Suppression System comprising:
an exhaust duct to receive an engine exhaust flow, said exhaust duct comprising a double-walled structure having an inner wall and an outer wall, said outer wall includes a multiple of openings; and
a spiral septum within said exhaust duct, said spiral septum includes a double-walled structure having a multiple of spiral septum openings, each of said spiral septum openings in communication with a spiral septum space between said double-walled structure of said spiral septum.

17. An InfraRed Suppression System comprising:
an outer exhaust duct defined along an axis, said outer exhaust duct having a multiple of openings;
an inner exhaust duct having a spiral opening, said inner exhaust duct defined along said axis and spaced from said outer exhaust duct to define an exhaust duct cooling air space therebetween; and
a spiral septum within said inner exhaust duct twisted about said axis, said spiral septum including a double-walled structure having a first wall and a second wall which defines a spiral septum space therebetween, said spiral septum space in communication with said exhaust duct cooling air space through said spiral opening.

18. The InfraRed Suppression System as recited in claim 17, wherein said exhaust duct cooling air space receives a ram airflow.

19. The InfraRed Suppression System as recited in claim 17, wherein said exhaust duct cooling air space receives an oil cooler airflow.

20. The InfraRed Suppression System as recited in claim 17, wherein said exhaust duct cooling air space receives an engine inlet particle separator airflow.

21. The InfraRed Suppression System as recited in claim 17, wherein said spiral septum includes a multiple of septum openings, each of said septum openings in communication with said spiral septum space.

* * * * *